Sept. 7, 1965 F. N. ANDERSON ETAL 3,205,319

CROSSBAR SLIDE SELECTOR SWITCH WITH A CURRENT CONDUCTING MEANS

Filed July 5, 1963 3 Sheets-Sheet 1

INVENTORS,
FRED N. ANDERSON AND
WALTER L. CHERRY
BY Edward L. Threedy
THEIR ATTORNEY.

CROSSBAR SLIDE SELECTOR SWITCH WITH A CURRENT CONDUCTING MEANS

Filed July 5, 1963

INVENTORS.
FRED N. ANDERSON AND
WALTER L. CHERRY
BY Edward C. Threedy
THEIR ATTORNEY Sept. 7, 1965 F. N. ANDERSON ETAL 3,205,319
CROSSBAR SLIDE SELECTOR SWITCH WITH A CURRENT CONDUCTING MEANS
Filed July 5, 1963 3 Sheets-Sheet 3

INVENTORS:
FRED N. ANDERSON &
WALTER L. CHERRY.
BY Edward C. Shreedy
THEIR ATTORNEY.

United States Patent Office 3,205,319
Patented Sept. 7, 1965

3,205,319

CROSSBAR SLIDE SELECTOR SWITCH WITH A CURRENT CONDUCTING MEANS

Fred N. Anderson and Walter L. Cherry, Highland Park, Ill., assignors to Cherry Electrical Products Corp., Highland Park, Ill., a corporation of Illinois

Filed July 5, 1963, Ser. No. 293,046
11 Claims. (Cl. 200—16)

This invention relates to a new and useful improvement in a crossbar slide selector switch and, more particularly, to a crossbar type switch having rectangular coordinates, as opposed to polar coordinates, of two switching circuit elements, and which affords positive and simplified circuit selections.

A principal object of our invention is to provide in a selector switch of this character a modular construction which allows simplified combinations thereof to obtain specific sequencing, or grouping, of electrical circuit requirements.

Another object of our invention is to provide in a selector switch of this character a circuit switching slide which includes a non-conductive housing for a tensioned beryllium copper contact.

Yet another object of our invention is to provide in a device of this character a printed circuit baseboard for supporting a plurality of current conducting switch indexing rails, which rails, in turn, individually carry a slidable circuit selector for completing the circuitry between any one of a number of printed circuits on the baseboard and the current conducting rails.

A still further object of our invention is to provide in a switch of this character a positive detent circuit contacting positioning means between the slide selector and the current conducting elements of the switch.

Other objects will appear hereinafter.

The invention consists in the novel combination and arrangement of parts to be hereinafter described and claimed.

The invention will be best understood by reference to the accompanying drawings showing the preferred form of construction, and in which.

Our invention resides in an improved construction of a crossbar type selector switch which may readily be employed in data processing machines, communication and timing devices, and electrical testing equipment of all types. By the preferred form of construction, our crossbar type of selector "switch" affords the distinct advantages of permitting a wide variety of circuit combinations to be achieved while conserving space and permitting production techniques that materially reduce the cost of manufacturing switches of this nature.

Figure 1:
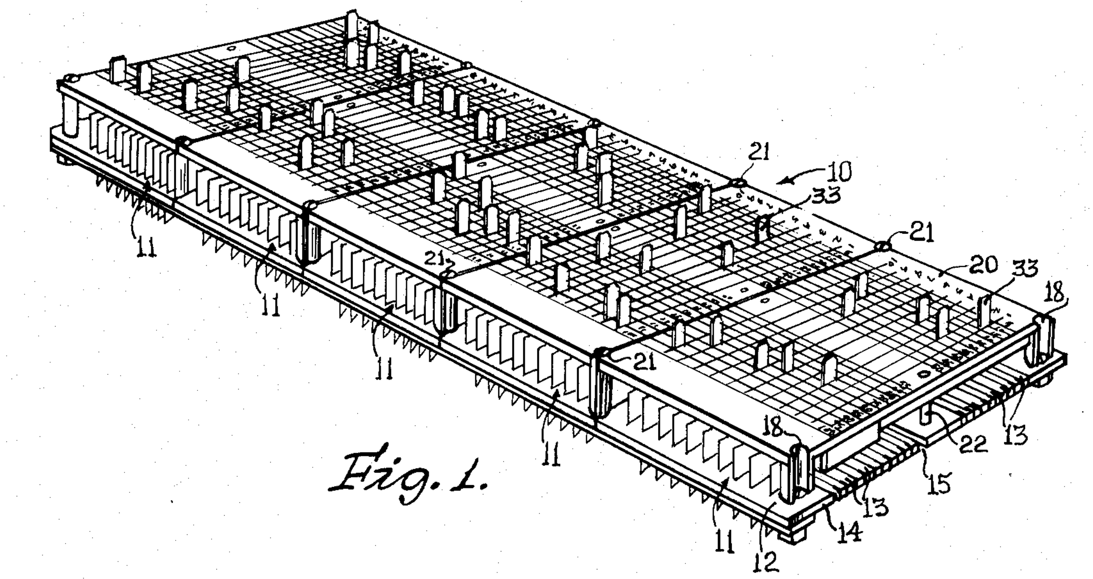
FIG. 1 is a perspective view of a grouping of cooperating selector switch modules.

Referring to FIG. 1, we disclose a gang type assembly 10 of our crossbar type selector switches, which assembly 10 comprises a plurality of selector switch modules 11, each of which is of identical construction and operation. Each of the selector switch modules 11 comprises a baseboard 12 made up of a non-conductive material and having printed on one face thereof in spaced parallel lines a plurality of electrical circuit conductor paths 13. These circuit paths 13 extend to one edge 14 of the baseboard 12 and terminate into a connector slot 15 which is adapted to receive a standard edge connector, not shown.

Figures 6, 7, 8:
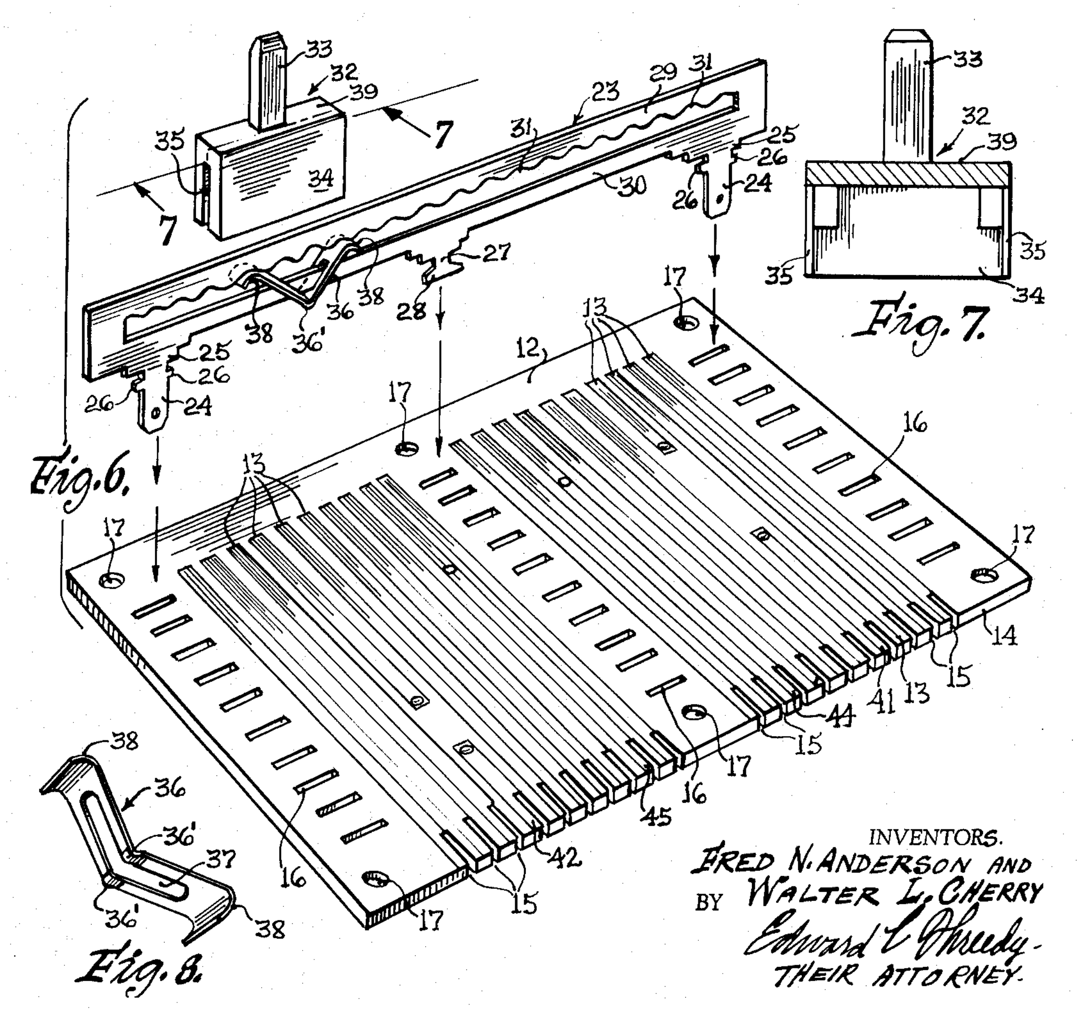
FIG. 6 is a perspective view of one switch slide in exploded relation with respect to its cooperating switch element.
FIG. 7 is a detailed sectional view of the slide housing taken on line 7—7 of FIG. 6.
FIG. 8 is a perspective view of the slidable spring contact member employed in our switch.

Three rows of equally spaced slots 16 are formed in the baseboard 12 with a row of slots 16 being adjacent corresponding opposite side edges thereof, and with the remaining row of slots 16 lying in the center line of the baseboard 12, as seen in FIG. 6. The slots of each of the rows are horizontally aligned transversely of the circuit paths 13 printed on the one face of the baseboard 12.

Figure 2:
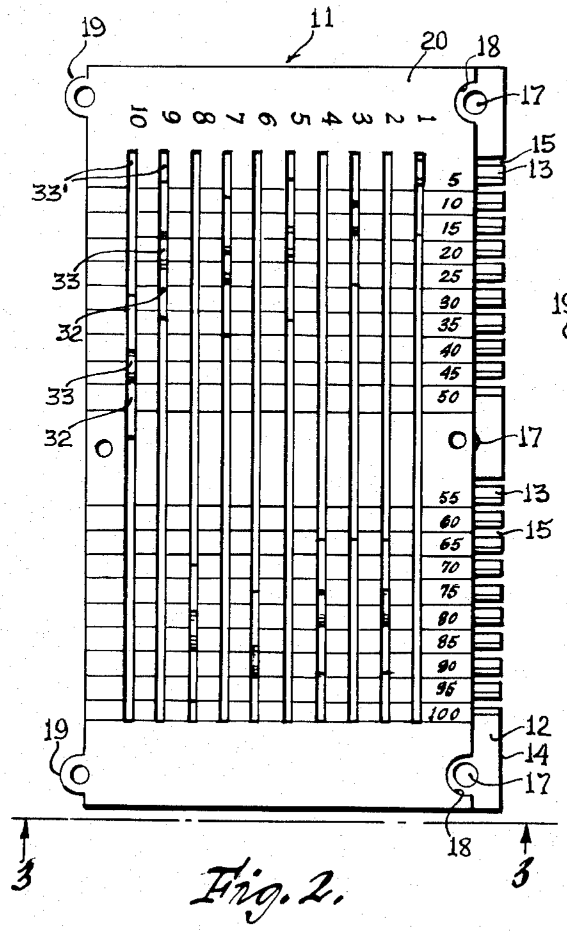
FIG. 2 is a top plan view of one of the crossbar type of selector switch modules.
Figure 3:
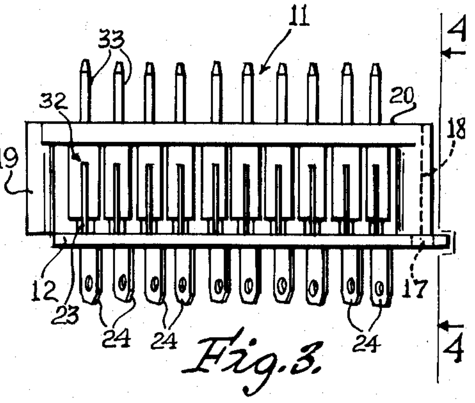
FIG. 3 is a side elevational view taken on line 3—3 of FIG. 2.

A cover plate 20 is provided for each of the switch modules 11, as seen in FIGS. 1 and 2. This cover plate 20 is provided with interconnecting means by which each of the individual modules 11 may be joined together to form an integral assembly, as shown in FIG. 1. The interconnecting means comprises depending legs 18 and 19 formed at each corner of the baseboard 12 with the corresponding corner legs 18 formed to provide semi-circular recesses while the opposite corresponding corner legs 19 are formed into semi-circular bosses. The legs 18 and 19 are adapted to be placed in alignment with the apertures 17 formed in each of the corners of the baseboard 12 and connected thereto by any suitable means such as nuts and bolts 21, as shown.

In the assembly as shown in FIG. 1, the semi-circular bosses 19 of one of the modules 11 are projected into the semi-circular recesses 18 provided by the next juxtaposed module 11 whereby each of the cover plates 20 and the baseboards 12 are secured together into a modular construction.

To provide medial support between the corners of the baseboard 12 and the cover plate 20, a supporting spacer 22 is placed therebetween in alignment with the aperture 17 formed in the center line of the baseboards 12, and through which a connecting bolt is adapted to be passed and secured by a nut.

Figures 4, 5:
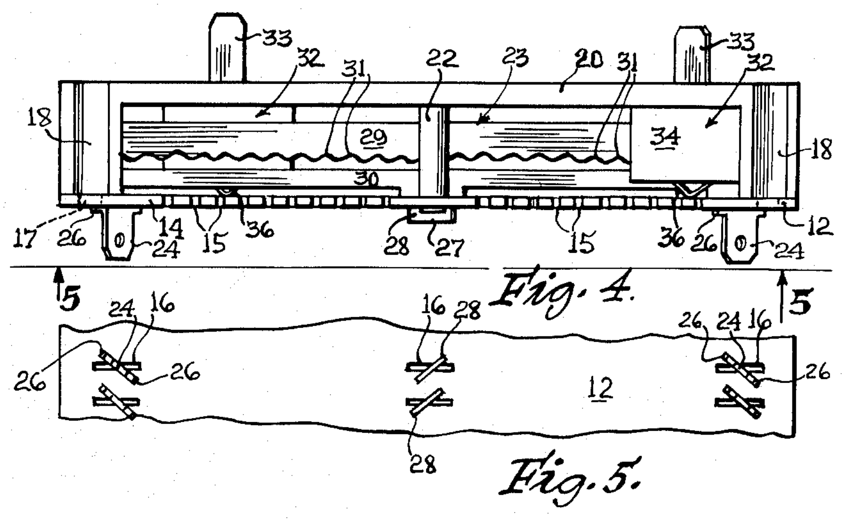
FIG. 4 is an end elevational view taken on line 4—4 of FIG. 3.
FIG. 5 is a fragmentary bottom plan view of the switch module.

Adapted to be connected to the baseboard 12 is a plurality of rails 23. These rails 23 are adapted to extend transversely over and in spaced relation with respect to the longitudinally extending printed circuit paths 13 and in spaced relation beneath the cover plate 20. These rails 23 include adjacent each end laterally extending terminals 24 of the quick connecting type well known in the art. These terminals 24 are provided with a stepped base 25 at their point of connection with the rail 23 so that upon insertion of the terminals 24 into selected horizontally aligned slots 16, the rail 23 throughout its longitudinal length will be spaced above the circuit paths 13. The terminals 24 are provided with laterally extending shoulders 26 which are spaced from the stepped base 25 a distance equal to the thickness of the baseboard 12. These shoulders 26, together with the free ends of the terminals 24, are adapted to be projected through the slot 16 formed in the baseboard 12 and then slightly twisted about their vertical axes so as to lie in an oblique plane beneath the baseboard 12 out of alignment with the slot 16 thus connecting the rails 23 in their desired position upon the baseboard 12, as seen in FIGS. 4 and 5. Each of the rails 23 intermediate its terminals 24 is provided with a supporting lug 27 which is substantially T-shaped in cross section so that the cross piece 28 thereof is adapted to be projected through the slot 16 formed in the center line of the baseboard 12, as seen in FIGS. 4 and 5. This cross piece 28 of the lug 27 is then adapted to be twisted about its vertical axis, as seen in FIG. 5, so as to mount the rail 23 to the baseboard 12.

As shown in FIG. 6 each of the rails 23 provide spaced apart parallelly extending vertically disposed bars 29 and 30. The underside of the bar 29 which confronts the bar 30 is provided with a series of longitudinally aligned detents 31 with each of the detents 31 being vertically aligned with respect to one of the circuit paths 13 printed on the baseboard 12. This for a purpose hereinafter made apparent. The bar 30 is adapted to transversely extend above and in spaced relation to the circuit paths 13 printed on the one face of the baseboard 12. The bar 30 acts as a mechanical stiffener for the entire assembly and prevents the baseboard 12 from bowing outwardly due to the spring force of the many sliding contacts hereinafter described. This bar 30 also acts as a guide and stabilizer for the sliding spring contacts and their housing and prevents transverse wobble of these elements in relation to their movement over the circuit paths 13.

Adapted to be mounted on each of the rails 23 is a selector slide housing 32. This slide housing 32 includes a laterally projecting finger piece 33 which is adapted to project out of a corresponding slot 33′ formed in the plate 20. It should be noted that for each rail 23 there is a corresponding longitudinally extending slot 33′ formed in the plate 20. The slide housing 32 comprises a hollow body 34 which is of a substantially rectangular shape and which has horizontally aligned slots 35 formed in its opposite end walls. This slide 32 has a normal open bottom so that the body 34 thereof may be placed upon the rail 23 with the bars 29 and 30 projected through the slots 35 formed in each end thereof. It should be noted that these slots are of such a depth that both bars 29 and 30 are covered by the body 34 of the slide housing 32.

Positioned within the body 34 of the slide 32 is a circuit contact 36. This circuit contact 36 is substantially V-shaped in cross section and has a slot 37 extending from the vertex thereof partially throughout the length of each of the arms of the V-shaped contact 36. As shown in FIG. 8, the spring contact 36 has the vertex thereof dimpled as at 36′ so as to present enlarged contact areas. The free ends of the arms of the contact 36 are curved in a downward direction so as to present end bearing surfaces 38 which conform to the configuration of the detents 31 formed in the under edge of the top bar 29 of each of the rails 23. The contact 36 is positioned upon the rail 23 by having the lower bar 30 inserted into the slot 37 formed in each of the arms of the V-shaped contact 36 and with the free ends of said arms positioned between the bars 29 and 30 of each of the rails 23 as shown in FIG. 6 with the curved bearing surfaces 38 in yieldable engagement with corresponding detents 31 formed in the underside of the bar 29 of the rail 23. The slide housing 32 is then placed over the rail 23 with the bars 29 and 30 projecting out of the end slots 35 formed in the housing thereof. The contact 36 is positioned within the hollow body 34 of the slide 32 and as the contact 36 is of a size greater than the width of the slot 35 it is contained within and movable longitudinally over the rail 23 with the slide housing 32.

The top wall 39 of the body 34 of the slide housing 32 is adapted to be in facial abutment with the under side of the plate 20 with the finger piece 33 projecting through one of the slots 33′ formed therein. By this construction, we have provided a slidable circuit contact 36 which by reason of the positive detents 31 formed in the supporting rail 23, provides a positive circuit connection between any of the selected circuit paths 13 printed on the one face of the baseboard 12 and the circuit conductors connected to the terminals 24 of the rail 23.

In assembling the slide selector switch, it should be noted that when the slidable circuit contact 36 is projected on to the lower bar 30 of the rail 23, the contact point thereof will project downwardly from the lower edge of the bar 30 a sufficient distance so that when the rail 23 is mounted on the baseboard 12 as hereinbefore described, the contact 36 will be slightly yieldably compressed between the baseboard 12 and its slidable connection with the detents 31 formed in the top bar 29 of the rail 23. This compression will tend to slightly separate the bearing surfaces 38 away from each other so that they will lie in conforming facial abutment with the detents 31.

The selector switch as shown in FIG. 2 discloses a singular module 11 which includes ten slide switches 32 and twenty printed circuit conductors 13 so that by the inherent design such module 11 is capable of providing two hundred circuit combinations.

The module construction, as shown in FIG. 1, wherein there are five modules 11, affords a total of one thousand circuit combinations. By the construction of the selector switch modules 11 hereinbefore described, the printed circuit conductors 13 of one module 11 may be connected to corresponding circuit conductors 13 of a juxtaposed module 11.

Figure 9:
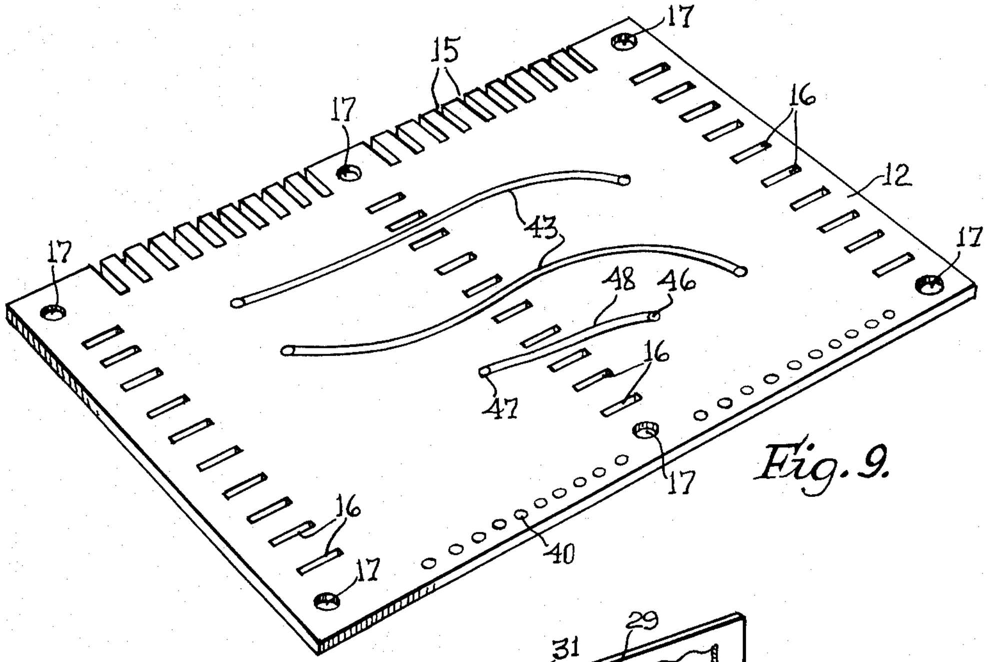
FIG. 9 is a perspective view of the rear surface of the baseboard showing certain electrical connections thereon.

As shown in FIG. 9, the one edge of the baseboard 12 on the rear face thereof is provided with a plurality of circuit connectors 40 in the form of conductive rivets. A connection between modules 11 may be made from these conductive rivets 40 by a a suitable wire connector or any other type of connector suitable for such purposes and which may be readily connected to the connector slots 15 provided by the next juxtaposed unit.

Referring to FIG. 6, we disclose a method of varying the circuitries which may be established through the elements of this improved selector switch. In such figure, it is noted that the circuit conductor paths 41 and 42 have a portion of their longitudinal length interrupted. The interrupted portion of such paths 41 and 42 are inner connected by a circuit conductor 43 provided by the rear face of the baseboard 12, as seen in FIG. 9.

Again referring to FIG. 6, we disclose circuit conductor paths 44 and 45 as containing conductor rivets 46 and 47 respectively, which rivets are inner connected by a conductor 48 carried by the rear face of the baseboard 12, as seen in FIG. 9.

These inner connections between circuit paths 13 afford circuit variations and multiplications. The same arrangement of inner connections may be made between the individual terminals 24 of each of the current conducting rails 23 without departing from the spirit of this invention.

Referring to FIGS. 10 through 13 wherein we disclose a modified form of a current conducting switch member 49. This modified switch member 49 is mounted on the rail 23 in the same manner as is the circuit contact 36 heretofore described. The modified switching member 49 comprises a substantially V-shaped contact member 50, which is provided with a center slot 51 extending from the vertex thereof partially throughout the length of each of the arms thereof. The arms terminate into oppositely extending arcuated fingers 52. These fingers 52 are adapted to be projected through openings 53 formed in each of the arms of a V-shaped indexing plate 54.

Figure 10:
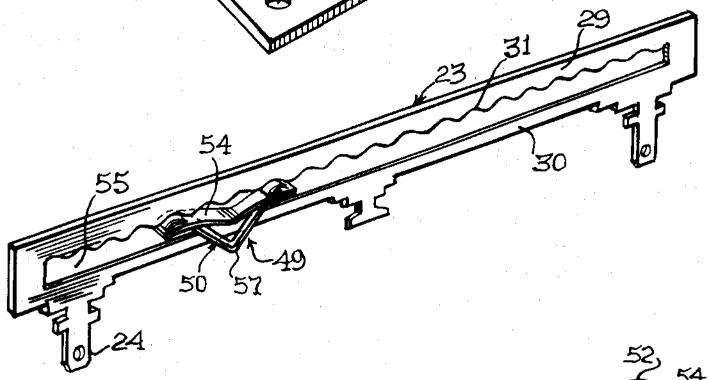
FIG. 10 is a perspective view of a modified form of a crossbar type selector switch unit.
Figure 12:
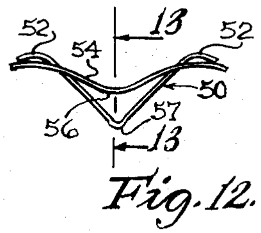
FIG. 12 is a side elevational view of the modified switch unit.
Figure 11:
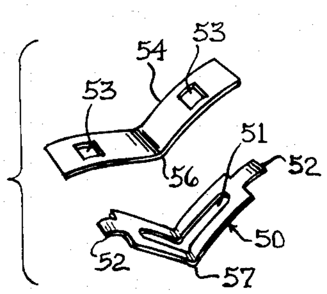
FIG. 11 is a perspective view of the parts of the switch unit in exploded relation.
Figure 13:
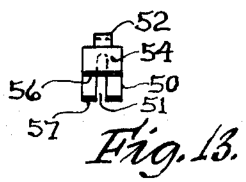
FIG. 13 is a detailed sectional view taken on line 13—13 of FIG. 12.

As shown in FIG. 10, the bottom bar 30 of the rail 23 is slidably positioned in the slot 51 formed in the V-shaped switching member 50. The V-shaped indexing plate 54 is positioned in the opening 55 formed between the bars 29 and 30 and has the arcuated fingers 52 of the switching member 50 projected through the openings 53 formed in the opposite arms thereof with the fingers 52 in abutment with the detents 31 formed in the bottom edge of the top bar 29.

The indexing plate 54 is so constructed that the vertex 56 thereof will engage the top edge of the bar 30 while the free ends of the V-shaped arms will maintain yieldable pressure upon the fingers 52 of the switching member 50 to maintain the same in contact with the detents 31 provided by the bar 29.

By this modification, the resilient force producing the positive detenting action between the detents 31 and the switching contacting member 50 is between the lower bar 30 and the detents 31 thus permitting a lighter contact pressure point between the rounded vertex 57 of the switching member 50 and the circuit conductors 13. This modified form greatly reduces the frictional wiping action of the switching member 50 over the conductors 13 and extends the life thereof substantially.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A switch of the class described comprising
   (a) a baseboard of insulated material having thereon a plurality of spaced parrallelly extending individual circuit conductors terminating at one side edge of the baseboard into electrical circuit connectors,
   (b) a cover connected to said baseboard and having formed therein a slot extending transversely with respect to said circuit conductors,
   (c) means connecting said cover above and in spaced relation to said circuit conductors on said baseboard,
   (d) a current conducting means mounted on said baseboard beneath said cover and extending transversely to and above said circuit conductors on said baseboard, a switch actuating means slidably mounted on said current conducting means beneath said cover and having a portion extending through the slot formed in said cover,
   (e) a current conducting member carried by said switch actuating means slidably on said current conducting means and movable longitudinally thereover transversely of and into contact with said circuit conductors for establishing a complete circuit between a pre-selected circuit conductor and said current conducting means,
   (f) and an indexing means provided by said current conducting means with said indexing means being engaged by said current conducting member so as to yieldably position said current conducting member in contact with said circuit conductors on said baseboard as said current conducting member is moved thereover.

2. A switch of the class described and defined by claim 1 wherein said current conducting means comprise a rail having two spaced apart parallelly extending bars with one of said bars slidably supporting said current conducting switching member and the other of said bars carrying said indexing means.

3. A switch of the class described comprising
   (a) a baseboard of insulated material having printed on one face thereof a plurality of spaced parallelly extending individual circuit conductors terminating at one side edge of the baseboard into slots adapted to receive electrical circuit connectors,
   (b) a cover connected to said baseboard and having formed therein a slot extending transversely with respect to said circuit conductors,
   (c) means connecting said cover above and in spaced relation to said circuit conductors printed on said one face of said baseboard,
   (d) a current conducting rail mounted on said baseboard beneath and in spaced relation to said cover and extending transversely to and above said printed circuit conductors on said one face of said baseboard,
   (e) said rail providing terminals at opposite ends thereof with said terminals projected through openings formed in said baseboard so as to have a portion thereof extending beyond the opposite side thereof,
   (f) with said portions twisted about their long axis so as to fixedly mount said rail to said baseboard, a switch actuating means slidably mounted on said current conducting rail beneath said cover and having a portion extending through the slot formed in said cover,
   (g) a current conducting switching member carried by said switch actuating means slidably on said current conducting rail and movable longitudinally thereover transversely across and into contact with said circuit conductors for establishing a complete circuit between a pre-selected circuit conductor and said current conducting rail.

4. A switch of the class described comprising
   (a) a baseboard of insulated material having printed on one face thereof a plurality of spaced parallelly extending individually circuit conductors terminating at one side edge of the baseboard into slots adapted to receive electrical circuit connectors,
   (b) a cover connected to said baseboard and having formed therein a slot extending transversely with respect to said circuit conductors,
   (c) means connecting said cover above and in spaced relation to said circuit conductors printed on said one face of said baseboard,
   (d) a current conducting rail mounted on said baseboard beneath and in spaced relation to said cover and extending transversely to and above said printed circuit conductors on said one face of said baseboard,
   (e) said rail providing terminals at opposite ends thereof with said terminals projected through openings formed in said baseboard so as to have a portion thereof extending beyond the opposite side thereof,
   (f) with said portions twisted about their long axis so as to fixedly mount said rail to said baseboard, a switch actuating means slidably mounted on said current conducting rail beneath said cover and having a portion extending through the slot formed in said cover,
   (g) a current conducting switching member carried by said switch actuating means slidably on said current conducting rail and movable longitudinally thereover transversely across and into contact with said circuit conductors for establishing a complete circuit between a pre-selected circuit conductor and said current conducting rail, and
   (h) a current conducting switching member indexing means provided by said rail engageable by said switching member so as to yieldably position said switching member in contact with a selected printed circuit conductor as said switch member is moved over said rail.

5. A switch of the class described and defined by claim 4 wherein the indexing means comprises a plurality of detents provided by said rail with a detent in vertical alignment with a corresponding printed circuit conductor and with said detents yieldably engaged by said current conducting switching member as it is caused to be moved over said rail.

6. A slide selector switch comprising (a) a circuit bearing baseboard and a cover on one side thereof, means for connecting said cover to said baseboard in spaced relation with respect to one side thereof, (b) said baseboard having a plurality of printed circuit conductors on said one side and terminating at one edge into circuit connectors, (c) said cover having a plurality of slots formed therein extending transversely of said printed circuit conductors, (d) a slide switch supporting means mounted on said baseboard beneath said cover with a slide supporting means extending parallelly and in vertical alignment with each of said slots formed in said cover, (e) circuit connectors provided by each of said supporting means projected through opening formed in said baseboard for mounting said support means thereto and for conducting an electrical current therethrough, (f) a switch housing slidably carried on said supporting means beneath said cover, an actuating element provided by said switch housing extending out of a respective vertically aligned slot formed in said cover by which said switch housing is slidably moved over said slide switch supporting means, (g) a yieldable current conducting contact within said switch housing and movable therewith over said supporting means for establishing a circuit connection between each of said printed circuit conductors and said supporting means as said switch housing is slidably moved over said supporting means.

7. A slide selector switch as defined by claim 6 wherein said slide switch supporting means includes a plurality of current conducting rails, said rails providing at opposite ends thereof depending terminals adapted to be projected through openings formed in said baseboard so as to have a portion thereof extending beyond the opposite side thereof with said projected portions twisted about their long axis so as to mount said rails to said baseboard in spaced apart parallelly extending planes.

8. A slide selector switch comprising (a) a circuit bearing baseboard and cover on one side thereof, means for connecting said cover to said baseboard in spaced relation with respect to one side thereof, (b) said baseboard having a plurality of printed circuit conductors on said one side and terminating at one edge into circuit connectors, (c) said cover having a plurality of slots formed therein extending transversely of said printed circuit conductors, (d) a slide switch supporting means mounted on said baseboard beneath said cover with a slide supporting means extending parallelly and in vertical alignment with each of said slots formed in said cover, (e) circuit connectors provided by each of said supporting means projected through opening formed in said baseboard for mounting said support means thereto and for conducting an electrical current therethrough, (f) a switch housing slidably carried on said supporting means beneath said cover, an actuating element provided by said switch housing extending out of a respective vertically aligned slot formed in said cover by which said switch housing is slidably moved over said slide switch supporting means, (g) a yieldable current conducting contact within said switch housing and movable therewith over said supporting means for establishing a circuit connection between each of said printed circuit conductors and said supporting means as said switch housing is slidably moved over said supporting means, (h) and a switch housing indexing means provided by said switch supporting means and adapted to yieldably engage said current conducting contact so as to position the same in contact with said printed circuit conductors as said switch housing is moved over said supporting means.

9. A slide selector switch as defined by claim 8 wherein said yieldable current conducting contact is substantially V-shaped with the vertex thereof adapted to project outwardly of said switch housing so as to be in slidable contact with said printed circuit conductors on said baseboard, the free ends of the arms of said V-shaped contact yieldably engaging said indexing means as provided by said slide switch supporting means for positioning said current conducting contact in positive engagement with each of said printed circuit conductors as said switch housing is moved thereover.

10. A switch of the class described comprising (a) a baseboard of insulated material having thereon a plurality of spaced parallelly extending individual circuit conductors terminating at one side edge of the baseboard into electrical circuit connectors, (b) a cover connected to said baseboard and having formed therein a slot extending transversely with respect to said circuit conductors, (c) means connecting said cover above and in spaced relation to said circuit conductors on said baseboard, (d) a current conducting means mounted on said baseboard beneath said cover and extending transversely to and above said circuit conductors on said baseboard, a switch actuating means slidably mounted on said current conduction means beneath said cover and having a portion extending through the slot formed in said cover.

(e) a current conducting switching member carried by said switch actuating means slidably on said current conducting means and movable longitudinally thereover transversely of and into contact with said circuit conductors for establishing a complete circuit between a pre-selected circuit conductor and said current conducting means, and (f) means independent of said current conducting switching member for inter-connecting selected portions of said individual circuit conductors carried by said baseboard for establishing a multitude of circuits therebetween.

11. A switch of the class described comprising (a) a baseboard of insulated material having thereon a plurality of spaced parallelly extending individual circuit conductors terminating at one side edge of the baseboard into electrical circuit connectors, (b) a cover connected to said baseboard and having formed therein a slot extending transversely with respect to said circuit conductors, (c) means connecting said cover above and in spaced relation to said circuit conductors on said baseboard, (d) a current conducting means mounted on said baseboard beneath said cover and extending transversely to and above said circuit conductors on said baseboard, a switch actuating means slidably mounted on said current conducting means beneath said cover and having a portion extending through the slot formed in said cover, (e) a current conducting member carried by said switch actuating means slidably on said current conducting means and movable longitudinally thereover transversely of and into contact with said circuit conductors for establishing a complete circuit between a pre-selected circuit conductor and said current conducting means, (f) an indexing means provided by said current conducting means with said indexing means being engaged by said current conducting member so as to yieldably position said current conducting member in contact with said circuit conductors on said baseboard as said current conducting member is moved thereover, and (g) means independent of said current conducting member for inter-connecting selected portions of said individual circuit conductors carried by said baseboard for establishing a multitude of circuits therebetween.

References Cited by the Examiner

UNITED STATES PATENTS

| | | | |
|---|---|---|---|
| 2,927,985 | 3/60 | Rivers | 200—16 |
| 3,053,945 | 9/62 | Harton et al. | 200—16 |

BERNARD A. GILHEANY, *Primary Examiner.*